United States Patent [19]

Miyabara

[11] 4,232,872
[45] Nov. 11, 1980

[54] OIL SEAL

[76] Inventor: Stanley M. Miyabara, 1002 Gen. McArthur Dr., Brentwood, Tenn. 37027

[21] Appl. No.: 26,411

[22] Filed: Apr. 2, 1979

[51] Int. Cl.³ ............................................. F16J 15/32
[52] U.S. Cl. ........................................ 277/47; 277/50; 277/153
[58] Field of Search ............................ 277/35, 38–43, 277/47–50, 52, 152, 153

[56] References Cited

U.S. PATENT DOCUMENTS

| 2,468,247 | 4/1949 | Victor | 277/52 X |
| 2,692,786 | 10/1954 | Reynolds | 277/35 |
| 2,856,219 | 10/1959 | Kosatka | 277/38 |
| 3,011,814 | 12/1961 | Rhoads et al. | 277/47 X |
| 3,114,558 | 12/1963 | Rhoads et al. | 277/47 X |

FOREIGN PATENT DOCUMENTS

| 590874 | 7/1947 | United Kingdom | 277/40 |
| 851246 | 10/1960 | United Kingdom | 277/42 |
| 1000879 | 8/1965 | United Kingdom | 277/153 |
| 1025884 | 4/1966 | United Kingdom | 277/153 |

*Primary Examiner*—Robert S. Ward, Jr.
*Attorney, Agent, or Firm*—Abe Hatcher

[57] ABSTRACT

An annular seal having two outer shoulders joined together by a flanged neck and an inner V-shaped lip one arm of which terminates in a section which fits against one of said shoulders in a parallel manner for preventing oil leakage.

2 Claims, 2 Drawing Figures

U.S. Patent  Nov. 11, 1980  4,232,872
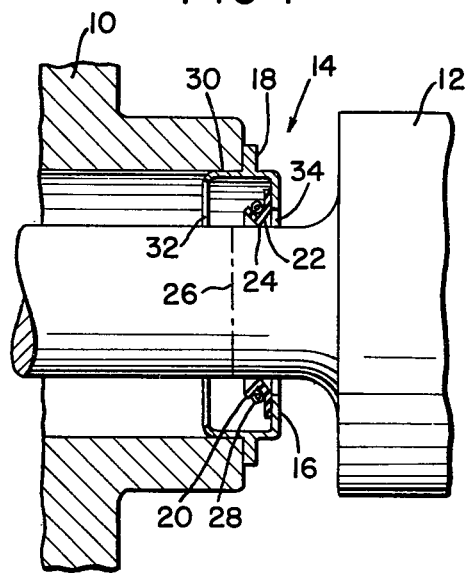
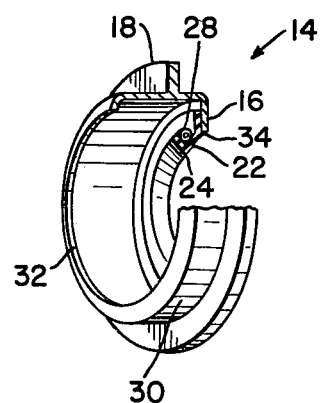

OIL SEAL

BACKGROUND OF THE INVENTION

1. Field of the Invention

This invention relates to seals. More particularly, it relates to an annular seal of improved structure for preventing leakage of oil between a housing and a driven member such as a shaft, axle or the like.

2. Description of the Prior Art

There is presently no known way of preventing at least some oil leakage between housing and driven member when a seal has worn out and has made a groove or notch in the surface of the driven member for the oil to leak through, since the groove or notch remains even when a new seal is used. Replacing the old seal with a wider one is helpful, but the seal can still eventually slip back to where the groove is so that the oil begins to leak again.

SUMMARY OF THE INVENTION

After extended investigation I have found that constructing a seal so that it has a flange on a shoulder thereof will enable it to be used either as a substantially leak-proof new seal or as an equally good substantially leak-proof replacement seal for taking the place of wornout prior art seals.

DESCRIPTION OF THE DRAWING AND OF THE PREFERRED EMBODIMENT

For a better understanding of my invention, reference will now be made to the drawing, which, together with the description thereof which follows, represents the preferred embodiment of the invention.

In the drawing,

FIG. 1 is a cross-sectional view through a housing/driven member assembly.

FIG. 2 is an end elevation, partially in section, taken on line 2—2 of FIG. 1.

Housing 10, which could be, for example, the hub of the wheel of a vehicle, is seen in FIG. 1 surrounding the shaft, for example, the axle, of a driven member 12 such as a wheel, with seal 14 fitting around the shaft in an annular manner and with contact with the shaft being made by a lip 24 of a V portion 20, 22 of the seal 14, and with contact with the housing 10 being made by two shoulders 16 and 30 joined together by a flanged neck portion 18. Dotted line 26 indicates what might have been the old contact or wear surface for a prior art seal. A spring such as 28 may be used to anchor the seal 14.

While the invention has been described in terms of preferred embodiments, the claims appended hereto are intended to encompass all embodiments which fall within the spirit of the invention.

Having thus described my invention and certain preferred embodiments thereof, I claim:

1. An annular seal for preventing oil leakage, said seal adapted to fit around a driven member as a unitary item and comprising two outer right-angled shoulders each of which comprises a top portion and a side portion substantially perpendicular to said top portion, said shoulders being joined together by a flanged projecting neck, and an inner V-shaped lip, one V arm of which extends as a lengthened section substantially perpendicular to said top portion of one of said shoulders and fits against said side portion of said one of said shoulders in a parallel manner, the top portion of the other of said shoulders being adapted to fit snugly against a housing, said side portion of said other of said shoulders being shorter than said side portion of said one of said shoulders, and said V-shaped lip being adapted to fit at its point firmly against said driven member.

2. A sealed housing-driven member structure comprising a housing, a driven member and an annular seal therebetween, said annular seal comprising in unitary relationship, as a casing two right-angled outer shoulders each having a top portion and a side portion substantially perpendicular to said top portion, said shoulders being joined together by a flanged projecting neck substantially perpendicular to the top portions of said shoulders and an inner V-shaped lip one V arm of which extends as a lengthened section substantially perpendicular to the top portion of one of said shoulders which fits against the side portion of said one of said shoulders in a parallel manner, the flange of said neck fitting against an end of said housing as a stop and the tip of said V-shaped lip fitting against the surface of said driven member.

* * * * *